US008547787B2

(12) United States Patent
Ozdemir et al.

(10) Patent No.: US 8,547,787 B2
(45) Date of Patent: Oct. 1, 2013

(54) SYSTEM AND TECHNIQUE TO SUPPRESS THE ACQUISITION OF TORQUE NOISE ON A MULTI-COMPONENT STREAMER

(75) Inventors: Ahmet Kemal Ozdemir, Asker (NO); Oeyvind Teigen, Oslo (NO); Lars Borgen, Sande (NO)

(73) Assignee: WesternGeco L.L.C., Houston, TX (US)

( * ) Notice: Subject to any disclaimer, the term of this patent is extended or adjusted under 35 U.S.C. 154(b) by 831 days.

(21) Appl. No.: 12/611,511

(22) Filed: Nov. 3, 2009

(65) Prior Publication Data

US 2011/0103181 A1    May 5, 2011

(51) Int. Cl.
*G01V 1/38*         (2006.01)
(52) U.S. Cl.
CPC ............ *G01V 1/3808* (2013.01); *G01V 1/3843* (2013.01)
USPC .............................................. 367/24; 367/21
(58) Field of Classification Search
USPC ................................. 367/15, 21–25
See application file for complete search history.

(56) References Cited

U.S. PATENT DOCUMENTS

| 7,379,386 | B2 | 5/2008 | Muyzert et al. |
| 7,426,439 | B2 | 9/2008 | Ozdemir et al. |
| 7,622,706 | B2* | 11/2009 | Maas ....................... 250/227.14 |
| 2006/0024530 | A1 | 2/2006 | Nolan |
| 2006/0133202 | A1* | 6/2006 | Tenghamn ....................... 367/24 |
| 2007/0195648 | A1* | 8/2007 | Borgen et al. ................. 367/178 |
| 2008/0219095 | A1 | 9/2008 | Perciot et al. |
| 2008/0270035 | A1 | 10/2008 | Ozdemir et al. |
| 2009/0161487 | A1 | 6/2009 | Kjellgren et al. |

OTHER PUBLICATIONS

International Search Report of PCT Application Serial No. PCT/US2010/053737 dated Jun. 30, 2011.

* cited by examiner

*Primary Examiner* — Krystine Breier

(57) ABSTRACT

A technique includes distributing particle motion sensors along the length of a seismic streamer. Each particle motion sensor is eccentrically disposed at an associated angle about an axis of the seismic streamer with respect to a reference line that is common to the associated angles. The sensors are mounted to suppress torque noise in measurements that are acquired by the particle motion sensors. This mounting includes substantially varying the associated angles.

19 Claims, 7 Drawing Sheets

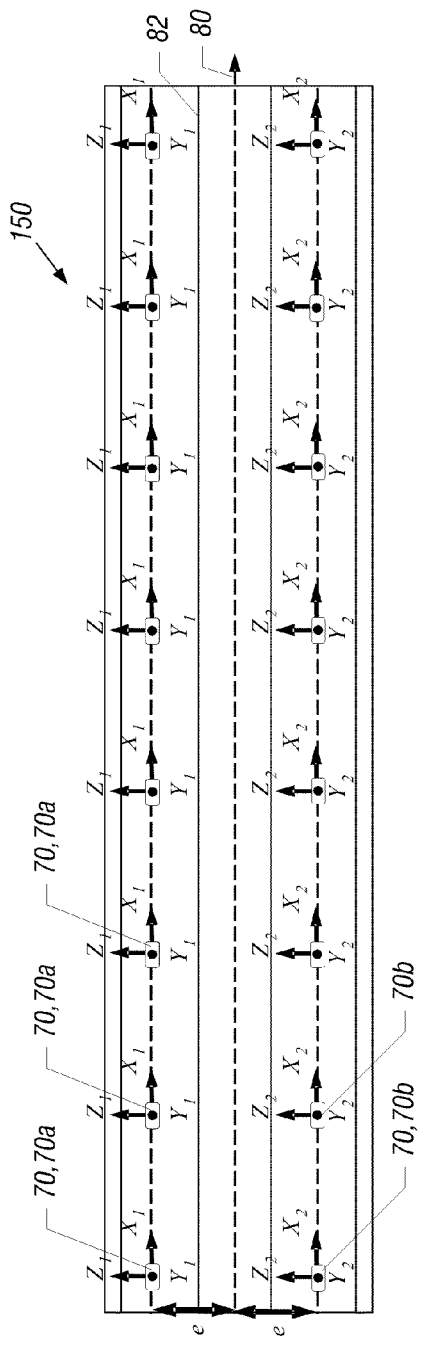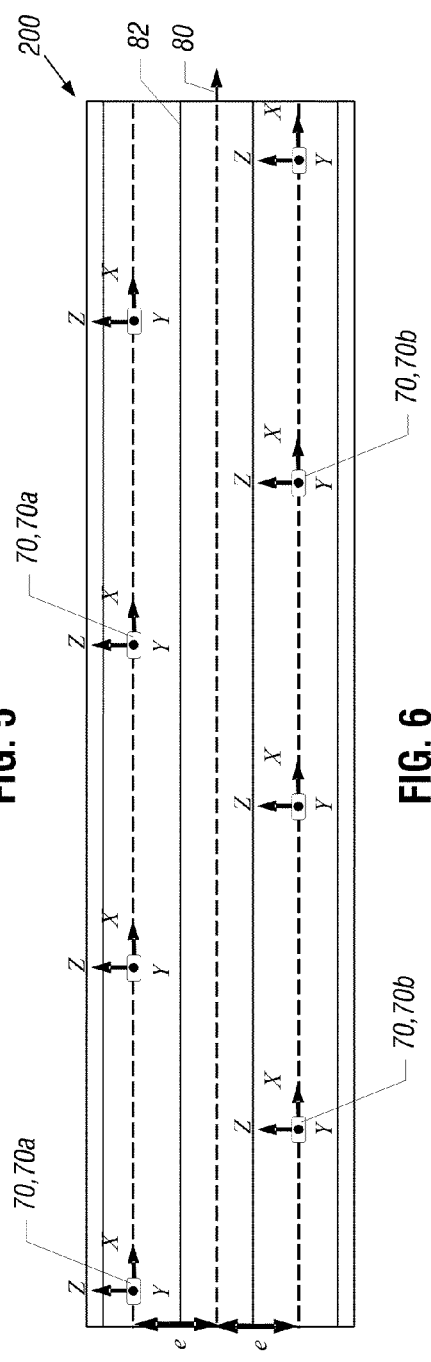

SYSTEM AND TECHNIQUE TO SUPPRESS THE ACQUISITION OF TORQUE NOISE ON A MULTI-COMPONENT STREAMER

BACKGROUND

The invention generally relates to a system and technique to suppress the acquisition of torque noise on a multi-component streamer.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes distributing particle motion sensors along the length of a seismic streamer. Each particle motion sensor is eccentrically disposed at an associated angle about an axis of the seismic streamer with respect to a reference line that is common to the associated angles. The sensors are mounted to suppress torque noise in measurements that are acquired by the particle motion sensors. This mounting includes substantially varying the associated angles.

In another embodiment of the invention, a technique includes providing particle motion sensors to acquire a seismic signal and torque noise while in tow. The technique includes orienting the sensors to modulate a wavenumber of the acquired torque noise.

In yet another embodiment of the invention, a system includes a seismic streamer and particle motion sensors that are distributed along the length of a seismic streamer. Each particle motion sensor is eccentrically disposed at an associated angle about an axis of the seismic streamer with respect to a reference line that is common to the associated angles. The sensors are mounted such that the associated angles are substantially varied to suppress torque noise in measurements that are acquired by the sensors.

Advantages and other features of the invention will become apparent from the following drawing, description and claims.

BRIEF DESCRIPTION OF THE DRAWING

FIG. 5 is a lengthwise cross-sectional view of the streamer of FIG. 4.

FIG. 6 is a lengthwise cross-sectional view of a streamer having eccentrically-disposed particle motion sensors according to an embodiment of the invention.

DETAILED DESCRIPTION

Figure 1:
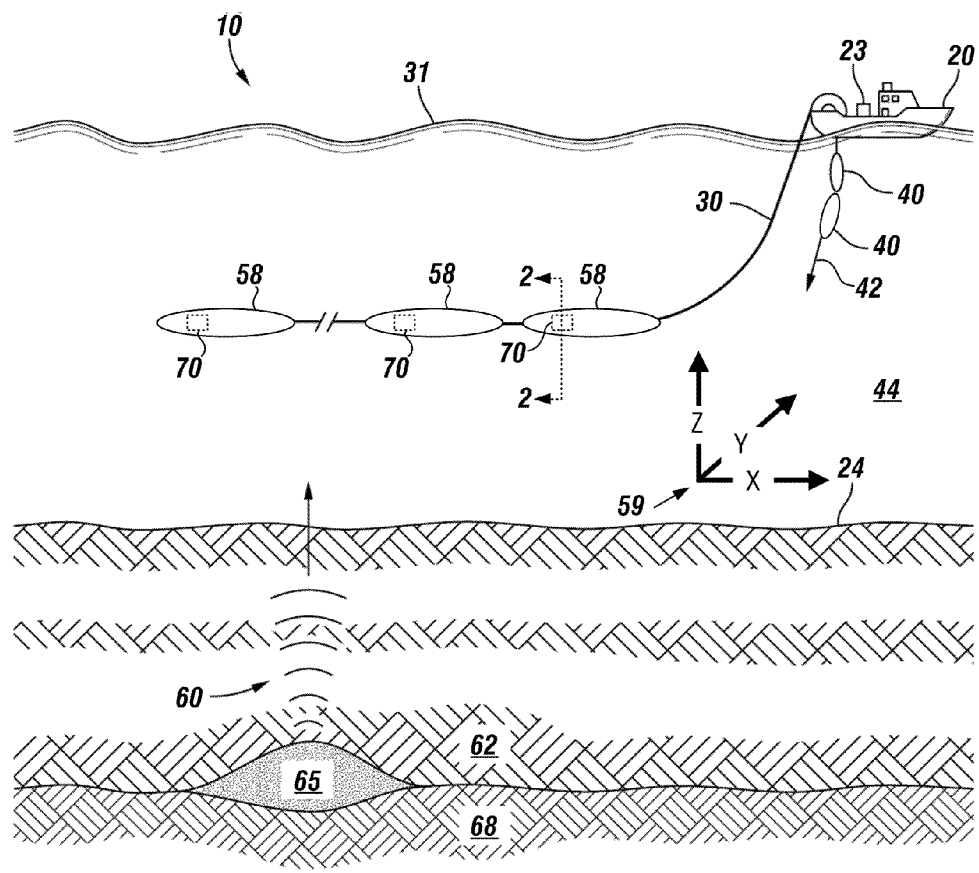
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which include, in accordance with embodiments of the invention, multi-component sensors. Each multi-component sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular seismic sensor unit 58 may include at least one particle motion sensor 70 for purposes of measuring a component of particle motion along a particular sensitive axis 59 (the x, y or z axis, for example). As a more specific example, the seismic sensor unit 58 may include a particle velocity sensor that is oriented to acquire a measurement of a particle velocity along the depth, or z, axis; a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other embodiments of the invention, the particle motion sensor(s) of each seismic sensor unit 58 may sense a particle motion other than velocity (an acceleration, for example).

In addition to the seismic sensor units 58, the marine seismic data acquisition system 10 also includes one or more seismic sources 40 (two exemplary seismic sources 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor unit 58 may provide a trace, which corresponds to a measure of a pressure wavefield by its hydrophone; and the seismic sensor unit 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land or on the vessel 20.

For particularly the case in which the streamer 30 has a solid core, the particle motion sensors 70 may acquire a significant degree of noise in addition to the desired particle motion signal. The noise is attributable to several types of noise sources and may include vibration noise, flow noise, acoustic noise, incoherent noise, etc. The noise acquired by the particle motions sensors 70 may also be a function of torque noise, which is introduced due to the eccentric positions of the particle motion sensors 70 with respect to the inline axis of the streamer 30.

Figure 2:
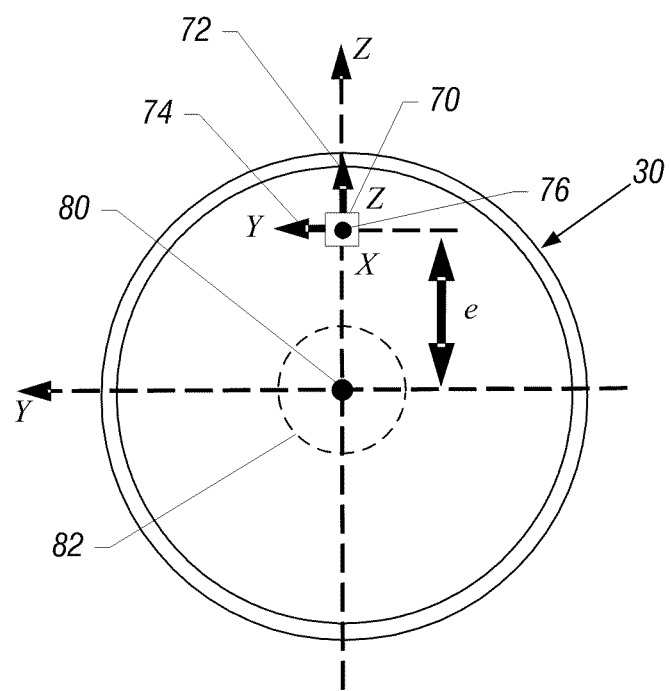
FIG. 2 is a cross-sectional view taken along line 2-2 of FIG. 1 according to an embodiment of the invention.

More specifically, as depicted in an exemplary cross-section of the streamer 30 in FIG. 2, a particle motion sensor 70 may be mounted in the streamer 30 such that the sensor 70 is positioned eccentrically with respect to a central axis 80 of the streamer cable. In other words, the particle motion sensor 70 may be mounted a distance (called "e" in FIG. 2) away from the cable's central inline axis 80. Due to this eccentric positioning, the particle motion sensor 70 is subject to rotation about the axis 80 as the streamer 30 is being towed, and as a result, the measurement acquired by the particle motion sensor 70 contains torque noise that is attributable to this rotation.

In FIG. 2, the particle motion sensor 70 has three primary axes for purposes of sensing particle motion: a vertical, or z, axis 72; a crossline, or y, axis 74; and an inline, or x, axis 76, which is directed out of the page and indicated by the "dot" in FIG. 2. As also depicted in FIG. 2, the streamer 30 may contain a solid core 82.

Because the torque noise is related to the rotation of the streamer 30 about the inline, or x, axis 80, the effect of the torque noise on the measured local crossline, or y, and vertical, or z, components are different, as described below:

$$N_y(t,x) = V_y(t,x) + e\ddot{\theta}(t,x) + R_y(t,x), \text{ and} \quad \text{Eq. 1}$$

$$N_z(t,x) = V_z(t,x) + e\dot{\theta}^2(t,x) + R_z(t,x), \quad \text{Eq. 2}$$

where "t" represents time; "x" represents the inline coordinate of the sensor position; "$N_y$" and "$N_z$" represent the y and z components, respectively, of the total noise present in the particle motion measurements; "$V_y$" and "$V_z$" represent the transversal vibration noise components along the y and z axes, respectively; "$\dot{\theta}$" represents the angular velocity about the axis 80; "$\ddot{\theta}$" represents the angular acceleration about the axis 80; and "$R_y$" and "$R_z$" represent the remaining noise components (acoustic noise, ambient noise, etc.) along the y and z axes, respectively.

In Eq. 1, the term "$e\ddot{\theta}(t,x)$" represents the y, or crossline, component of the torque noise, called "$\tau_y(t,x)$," as set forth below:

$$\tau_y(t,x) = e\ddot{\theta}(t,x). \quad \text{Eq. 3}$$

The $\tau_y(t,x)$ torque noise is usually significant for moderate values of eccentricity e and is referred to as the "torque noise" in the following discussion. It is noted that as set forth in Eq. 2, the cross component of the noise, $N_z(t,x)$, also contains a torque noise component, $e\dot{\theta}^2(t,x)$. However, because the torque induced noise on the local z, or vertical, component is proportional to the square of the angular velocity, the amplitude of this term is relatively small and is considered to be negligible in the following discussion.

Figure 3:
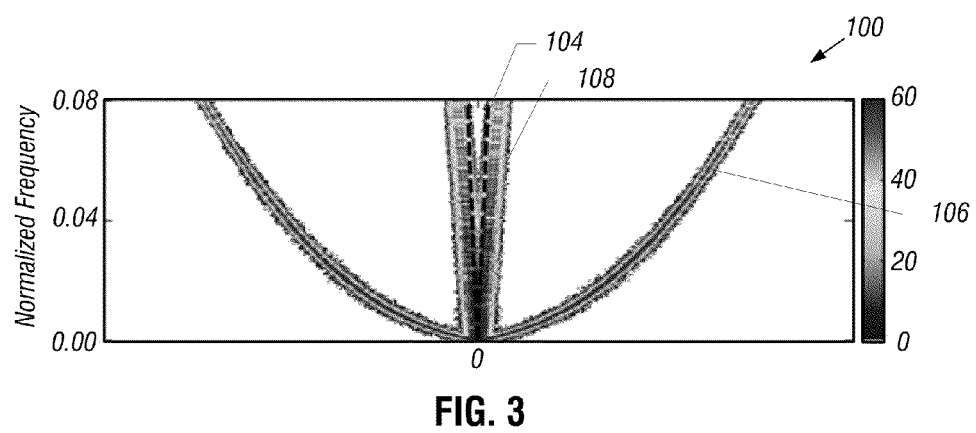
FIG. 3 is a synthetically-generated noise record in frequency-wavenumber space illustrating traversal vibration noise and torque noise.

In general, the propagation of the torque noise on the y component is slower than the seismic signal and faster than the transversal vibration noise. More specifically, FIG. 3 depicts a frequency-wavenumber (f-k) plot 100 of a synthetically-generated noise record acquired by particle motion sensors. This noise record includes transversal vibration noise 106 and torque noise 108. Also depicted in FIG. 3 is a signal cone 104, which defines the boundaries in f-k space for the expected seismic signal. As can be seen in this particular example, the torque noise 108 contaminates mostly the lowest frequencies of the useful seismic frequency band, as the torque noise 108 intersects the lower frequency portion of the signal cone 104. In general, it is difficult through signal processing to discriminate the torque noise inside the signal cone 104 from the desired particle motion signal.

Figure 4:
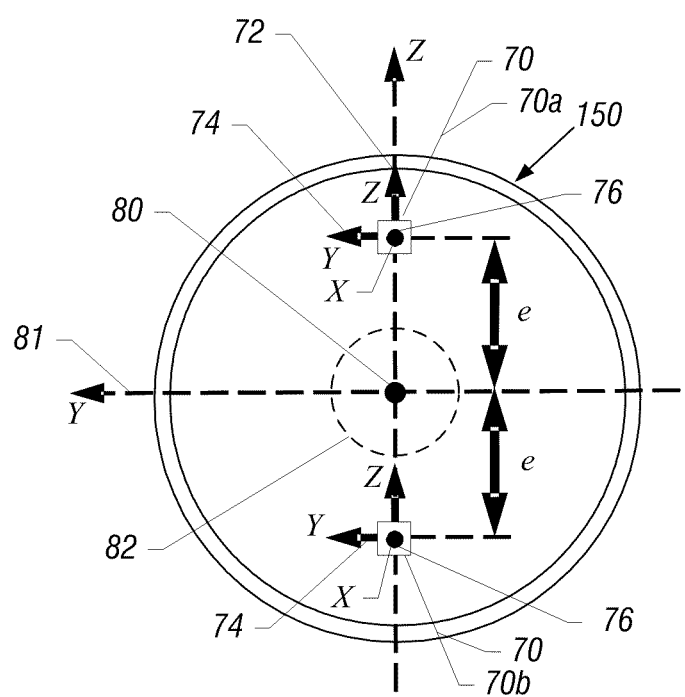
FIG. 4 is a transverse cross-sectional view of a streamer having eccentrically-disposed particle motion sensors, in accordance with an embodiment of the invention.

Referring to FIG. 4, for purposes of suppressing, if not eliminating, the degree of torque noise that is present in the signal cone 104, two multi-component sensors may be disposed at each inline sensor position. In this regard, referring to FIG. 4 (which depicts a transverse cross-section) a streamer 150, in accordance with embodiments of the invention, may contain two multi-component particle motion sensors (i.e., an upper sensor 70a and a lower sensor 70b, where each sensor 70a, 70b has the same design 70) at each inline sensor location. In accordance with some embodiments of the invention, the upper 70a and lower 70b sensors are located at different positions in the same y-z plane, and more particularly, each sensor 70a, 70b has a different phasing, or angle, about the inline axis 80. In this manner, the upper sensor 70a is disposed at an angle 162 of 90° (measuring in the clockwise direction) with respect to a crossline axis 81 of the streamer; and the lower sensor 70b is disposed at an angle 164 of 270° with respect to the crossline axis 81. In other words, the upper 70a and lower 70b sensors are spaced apart by 180° about the inline axis 80.

Both sensors 70a and 70b are disposed by the distance e from the inline streamer axis 80; and inline (x) 76 (denoted by a "dot" to show the axis 76 pointing out of the page), crossline (y) 74 and depth (z) 72 axes of the sensors 70a and 70b are oriented in the same directions such that the inline axes 76 of the sensors 70a and 70b are parallel, the crossline axes 74 of the sensors 70a and 70b are parallel and the depth axes 72 of the sensors 70a and 70b are parallel. The corresponding lengthwise cross-section of the streamer 150 is depicted in FIG. 5, in which each "dot" in the sensor 70 represents the crossline axis 74 pointing out of the page.

The different phasings of the particle motion sensors 70a and 70b induce torque noise with opposite polarities on the measurements that are acquired by the sensors 70a and 70b, as described below:

$$N_{y_1}(t,x) = V_y(t,x) + e\ddot{\theta}(t,x) + R_{y_1}(t,x), \text{ and} \quad \text{Eq. 4}$$

$$N_{y_2}(t,x) = V_y(t,x) - e\ddot{\theta}(t,x) + R_{y_2}(t,x), \quad \text{Eq. 5}$$

where "$N_{y_1}(t,x)$" represents the crossline, or y, component of the total noise acquired by the particle motion sensors 70a; and "$N_{y_2}(t,x)$" represents the crossline, or y, component of the total noise acquired by the particle motion sensors 70b. As can be seen from Eqs. 4 and 5, the measurements acquired by the particle motion sensors 70a and 70b may be added together to significantly suppress, or even eliminate, the sensed torque noise, as the sum of the measurements from particle motion sensors does not have a torque noise component because the opposite polarity components cancel each other out. However, the number of particle motion sensors for the streamer 150 is doubled, as compared to conventional arrangements. Additionally, the extra x and z components of the particle motion sensors are subject to similar noise modes and allow for only negligible additional noise attenuation.

Referring to FIG. 6, in accordance with other embodiments of the invention, a seismic streamer 200 (a lengthwise cross-section of which is depicted in FIG. 6) may be used. For the streamer 200, a single multi-component particle motion sensor 70 is disposed at each inline sensor position along the length of the streamer 200, and each particle motion sensor 200 is disposed the same distance e away from the inline axis 80 of the streamer 200. Unlike conventional arrangements, however, the phasing of the particle motion sensors 70 about the inline streamer axis 80 vary along the length of the streamer 200. The variation in phasing can be seen more clearly in FIG. 7, which is an illustration 220 of crossline cross-sections of the streamer 200 (i.e., y-z plane cross-sections) at adjacent sensor locations. As can be seen, the multi-component axes of the sensors 70 are aligned, and the sensor locations in the y-z plane vary by 180° from one adjacent sensor 70 to the next.

Figure 7:
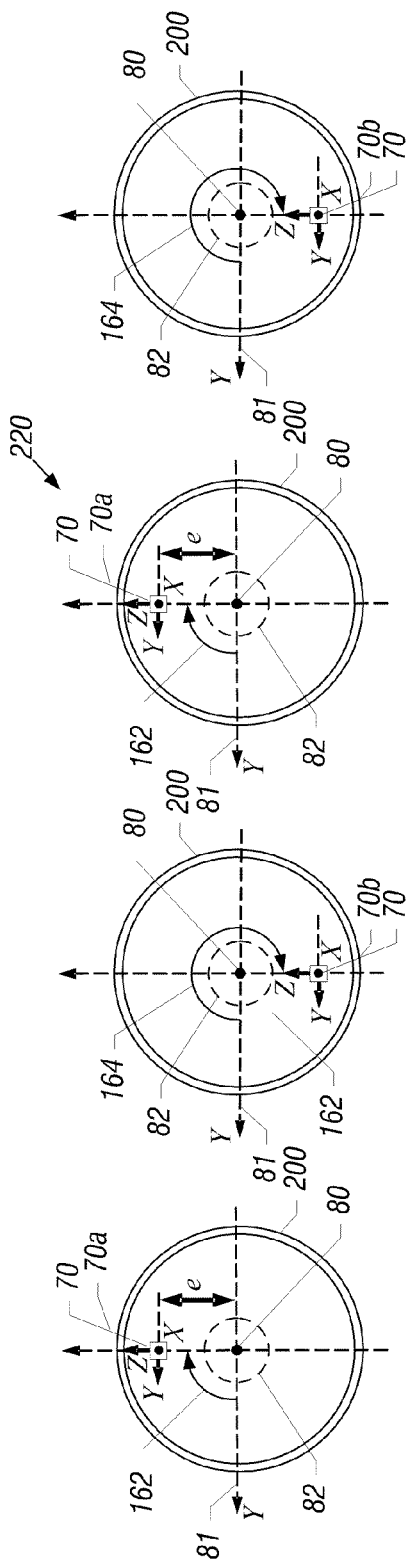
FIGS. 7 and 9 are illustrations of crossline cross-sections of streamers at adjacent sensor locations along the streamers according to embodiments of the invention.

More specifically, beginning with the leftmost cross-section that is depicted in FIG. 7, the sensor 70a is located at the 90° angle 162 about the inline axis 80; the next adjacent sensor 70b (to the left) is located at the 270° angle 164 about the inline axis 80; the next adjacent sensor 70a (to the left) is located at the 90° angle 162 about the inline axis 80; etc. In other words, a 180° phasing scheme is used such that (excluding the first and last sensors 70 on the streamer 200), each sensor 70 is disposed at an angle about the inline axis 80 that is 180° apart from the angles at which the immediately adjacent sensors (one on each side) are disposed.

Due to the above-described phasing, the measured torque noise is wavenumber modulated, as described below for the crossline component of the total noise:

$$N_y(t,x) = V_y(t,x) + e\ddot{\theta}(t,x)(-1)^{n(x)} + R_y(t,x), \quad \text{Eq. 6}$$

where "n" refers to the index of the corresponding sensor. In other words, the odd-indexed sensors 70 perceive the torque noise with an opposite phase than the even-indexed sensors 70. It is noted that the frequency-wavenumber spectrum of the particle motion signal and the transversal noise are not affected by these alternating orientation(s), because the sensors 70 at opposite sides of the central axis 80 have the same sensitivity (in amplitude and phase) to the signal and transversal vibration.

The corresponding crossline component of the total noise measurement in the frequency-wavenumber domain may be described as follows:

$$N_y(f,k) = V_y(f,k) + \frac{\tau_y(f, k + K_x/2) + \tau_y(f, k + K_x/2)}{2} + R_y(f,k), \quad \text{Eq. 7}$$

where "f" represents the frequency; "k" represents the wavenumber; "$\tau_y(f,k)$" represents the frequency-wavenumber transform of the torque noise, "$e\ddot{\theta}(t,x)$;" and "$K_x/2$" represents the Nyquist wavenumber, which is one half of the inverse of the inline sensor spacing.

Figure 8:
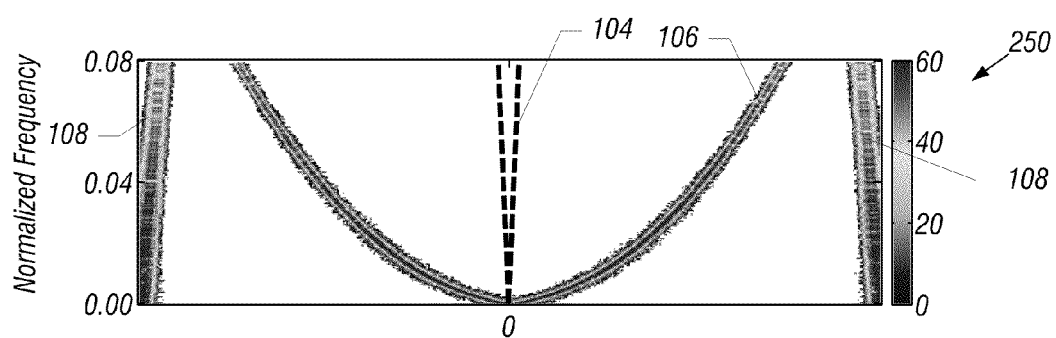
FIG. 8 is a synthetically-generated noise record in frequency-wavenumber space acquired by sensors of the streamer of FIG. 6 according to an embodiment of the invention.

Referring to FIG. 8, a frequency-wavenumber plot 250 of a synthetically-generated noise record illustrates the wavenumber modulation that may be achieved using the sensor orientation that is depicted in FIG. 6. The wavenumber modulation effectively moves the torque noise wavenumbers ("$K_x/2$") away from their original location (see FIG. 3, for example) and out of the signal cone 104.

In accordance with some embodiments of the invention, the particle motion sensors 70 may be arranged in two groups (a first group of sensors 70a and a separate second group of sensors 70b, for example) which form two separate sensor networks (one for each group) that may each independently transfer the acquired data to an onboard acquisition system. In other words, a dual sensor network may be used instead of a single sensor network. This type of implementation may increase the reliability of the data acquisition system. In this regard, if a failure occurs at one of the sensor networks, the other network is available to transfer the acquired data, although the sensor spacing is increased by a factor of two due to the failure. Other variations are contemplated and are within the scope of the appended claims.

Figure 9:
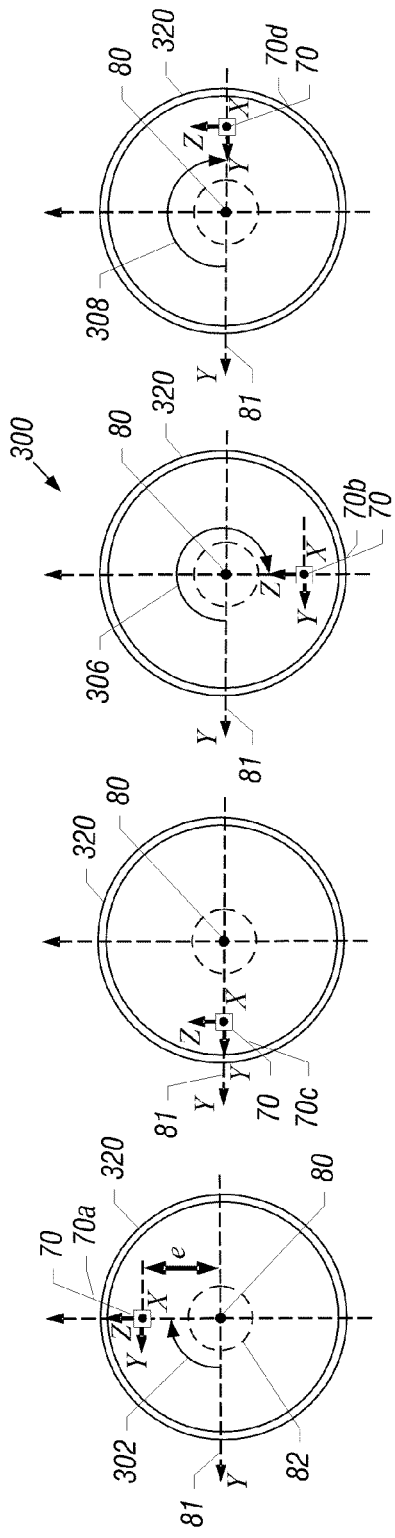

Other embodiments are contemplated and are within the scope of the appended claims For example, a phasing scheme other than the above-described alternating 180° phasing scheme may be employed in accordance with other embodiments of the invention. As a specific example, FIG. 9 is an illustration 300 of crossline cross-sections of a streamer 320 at inline sensor locations in accordance with another embodiment of the invention. For this embodiment, each inline sensor location has a single multi-component sensor 70, similar to the streamer 200. However, unlike the streamer 200, the streamer 320 employs a 90° phasing scheme in that the sensor locations are rotated by 90° about the inline streamer axis 80 from one adjacent sensor 70 to the next. Thus, each sensor 70 has either a 90° angle (as shown by an exemplary sensor 70a being disposed at a 90° angle 302 about the inline axis 80 with respect to the crossline axis 81); a 0° angle (as shown by an exemplary sensor 70c being disposed at a 0° angle about the inline axis 80 with respect to the crossline axis 81); a 270° angle (as shown by an exemplary sensor 70b being disposed at a 270° angle 306 about the inline axis 80 with respect to the crossline axis 81); or an 180° angle (as shown by an exemplary sensor 70d being disposed at an 180° angle 308 about the inline axis 80 with respect to the crossline axis 81). As with the other embodiments, the respective crossline, inline and depth axes of the sensors 70 remain aligned, regardless of their angles about the inline streamer axis.

Comparing the streamers 200 and 320, the streamer 200 pushes the torque noise further away from the desired seismic signal in the frequency-wavenumber domain than the streamer 320.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   distributing particle motion sensors along the length of a seismic streamer, each particle motion sensor being eccentrically disposed at an associated angle about an axis of the seismic streamer with respect to a reference line common to the associated angles; and
   mounting the sensors to suppress torque noise in measurements acquired by the particle motion sensors, comprising substantially varying the associated angles, the torque noise being a function of an angular acceleration of the streamer, wherein:
   the act of varying orientations forms a first group of the sensors that each has a first associated angle that is substantially the same and a second group of sensors that each has a second associated angle that is substantially the same and substantially one hundred eighty degrees apart from the first angle; and
   the first group of sensors are interleaved with the second group of sensors along the length of the streamer.

2. The method of claim 1, wherein the particle motion sensors each sense at least a crossline component of particle motion.

3. The method of claim 1, wherein the particle motion sensors comprise multi-component particle motion sensors.

4. The method of claim 1, wherein each of the particle motion sensors comprises a crossline axis, and the crossline axes are all oriented in substantially the same direction.

5. The method of claim 1, further comprising:
   providing a plurality of networks, each network comprising a different group of the particle motion sensors; and
   using each of the networks to independently communicate acquired data from the streamer.

6. The method of claim 1, wherein the particle motion sensors are arranged in adjacent groups and for each group, the associated angles cycle three hundred sixty degrees.

7. The method of claim 6, wherein the associated angles for each group are separated by approximately one hundred eighty degrees.

8. The method of claim 6, wherein each of the associated angles for each group are separated by approximately ninety degrees from two other associated angles of the group.

9. A system comprising:
   a seismic streamer; and
   particle motion sensors distributed along a length of the seismic streamer, each particle motion sensor being eccentrically disposed at an associated angle about an axis of the seismic streamer with respect to a reference line common to the associated angles, the sensors being mounted such that the associated angles are substantially varied to suppress torque noise in measurements acquired by the sensors, and the torque noise being a function of an angular acceleration of the streamer, wherein:
   a first group of the sensors has a first associated angle that is substantially the same and a second group of the sensors has a second associated angle that is substantially the same and substantially one hundred eighty degrees apart from the first angle; and
   the first group of sensors are interleaved with the second group of sensors along the length of the streamer.

10. The system of claim 9, wherein the particle motion sensors comprise multi-component particle motion sensors.

11. The system of claim 9, herein the particle motion sensors each sense at least a crossline component of particle motion.

12. The method of claim 9, further comprising:
   a plurality of networks, each network comprising a different group of the particle motion sensors,
   wherein each of the networks is adapted to independently communicate acquired data from the streamer.

13. The system of claim 9, the particle motion sensors are arranged in adjacent groups and for each group, the associated angles cycle three hundred sixty degrees.

14. The system of claim 13, wherein each of the associated angles for each group is separated by approximately ninety degrees from two other associated angles of the group.

15. The system of claim 9, further comprising:
   a vessel to tow the streamer.

16. A method comprising:
   distributing particle motion sensors along the length of a seismic streamer, each particle motion sensor being eccentrically disposed at an associated angle about an axis of the seismic streamer with respect to a reference line common to the associated angles; and
   mounting the sensors to suppress torque noise in measurements acquired by the particle motion sensors, comprising substantially varying the associated angles;
   wherein:
   each of the particle motion sensors is disposed at a different inline position along the axis of the streamer;
   the act of varying orientations forms a first group of the sensors that each has a first associated angle that is substantially the same and a second group of sensors that each has a second associated angle that is substantially the same and substantially one hundred eighty degrees apart from the first angle; and
   the first group of sensors are interleaved with the second group of sensors along the length of the streamer.

17. A system comprising:
   a seismic streamer; and
   particle motion sensors distributed along a length of the seismic streamer, each particle motion sensor being eccentrically disposed at an associated angle about an axis of the seismic streamer with respect to a reference line common to the associated angles, the sensors being mounted such that the associated angles are substantially varied to suppress torque noise in measurements acquired by the sensors;

wherein:

each of the particle motion sensors is disposed at a different inline position along the axis of the streamer;

the particle motion sensors form a plurality of groups, the plurality of groups comprising a first group of the sensors that each has a first associated angle that is substantially the same and a second group of sensors that each has a second associated angle that is substantially the same and substantially one hundred eighty degrees apart from the first angle; and the first group of sensors are interleaved with the second group of sensors along the length of the streamer.

18. The method of claim 1, wherein each of the particle motion sensors is disposed at a different inline position along the axis of the streamer.

19. The system of claim 9, wherein each of the particle motion sensors is disposed at a different inline position along the axis of the streamer.

* * * * *